United States Patent [19]

Weems et al.

[11] 4,238,289
[45] Dec. 9, 1980

[54] NUCLEAR REACTOR CONDENSER DOOR ARRANGEMENT

[75] Inventors: Sterling J. Weems, Chevy Chase, Md.; Harold W. McCurdy, Vienna, Va.

[73] Assignee: Westinghouse Electric Corp., Pittsburgh, Pa.

[21] Appl. No.: 435,903

[22] Filed: Jan. 23, 1974

Related U.S. Application Data

[63] Continuation of Ser. No. 230,641, Mar. 1, 1972, abandoned, which is a continuation of Ser. No. 837,443, Jun. 30, 1969, abandoned.

[51] Int. Cl.² .............................................. G21C 13/00
[52] U.S. Cl. .......................................... 176/38; 176/37
[58] Field of Search ............................... 176/37, 38, 87

[56] References Cited

U.S. PATENT DOCUMENTS

| 3,047,485 | 7/1962 | Ellis | 176/38 |
| 3,423,286 | 1/1969 | Weems et al. | 176/37 |
| 3,580,806 | 5/1971 | Weems et al. | 176/37 |

FOREIGN PATENT DOCUMENTS

| 1485611 | 5/1967 | France | 176/37 |
| 909193 | 10/1962 | United Kingdom | 176/38 |

*Primary Examiner*—Harvey E. Behrend
*Attorney, Agent, or Firm*—J. R. Campbell; Z. L. Dermer

[57] ABSTRACT

A generally annular condenser compartment of a nuclear reactor containment structure contains a large quantity of fusible material in a solid state, such as ice, for absorbing the energy released from a loss-of-coolant accident in the reactor coolant system. Inlet and outlet doors, which are normally closed, are provided at the bottom and the top, respectively, of the condenser compartment to permit the necessary inflow and outflow of gases and liquids during a loss-of-coolant accident. The inlet doors and door ports are so constructed that during an accident, energy flow is distributed substantially uniformly into all sections of the condenser.

4 Claims, 15 Drawing Figures

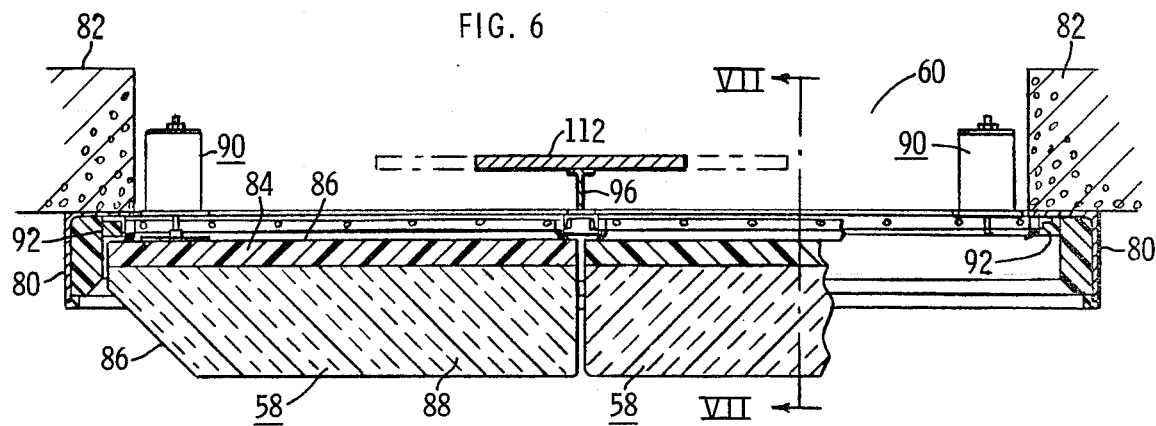
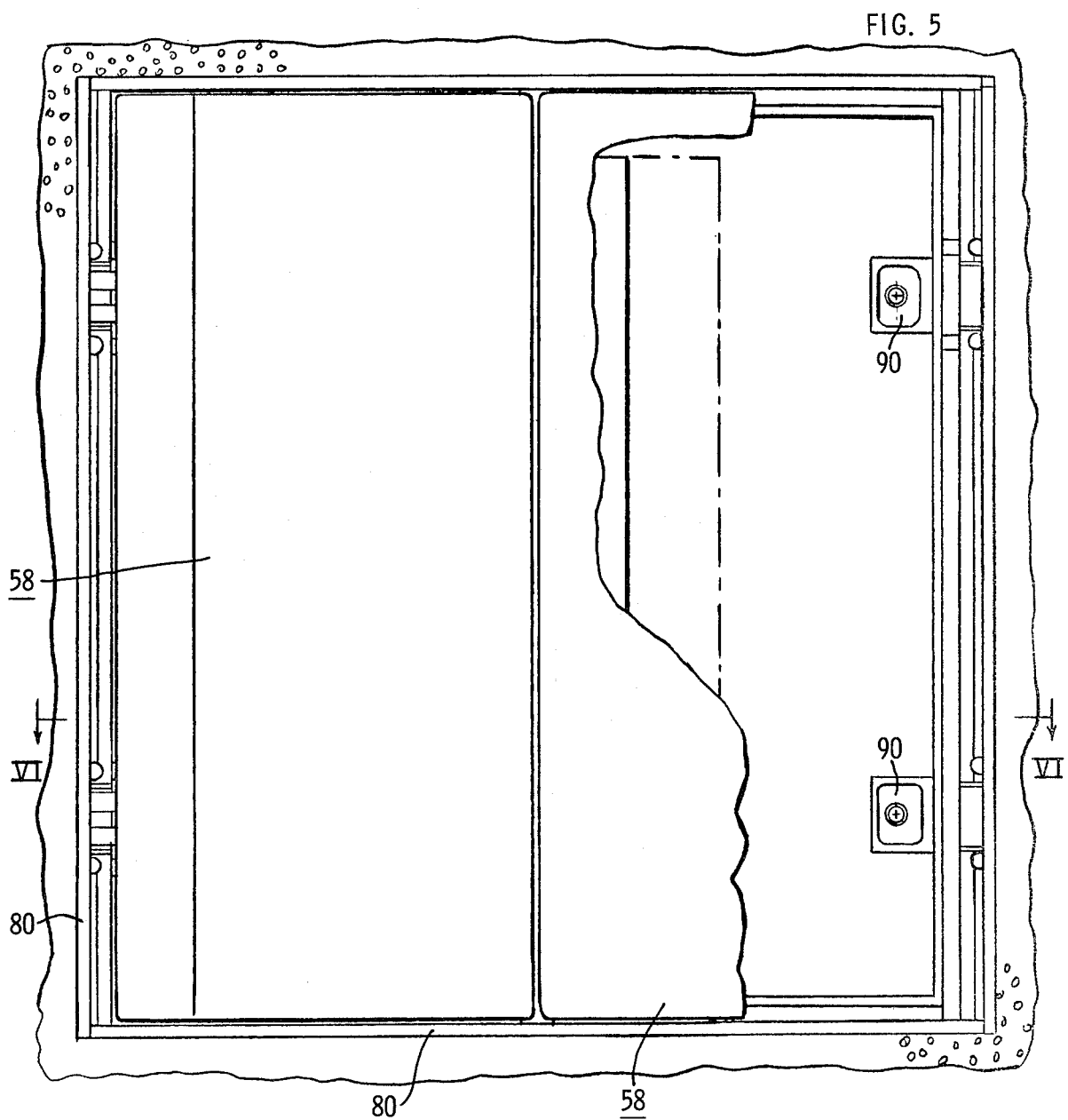

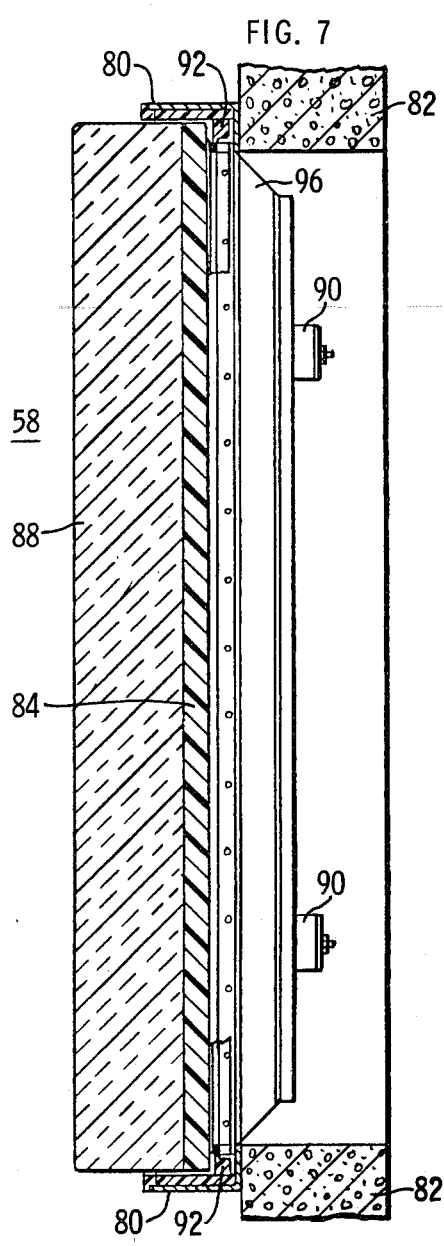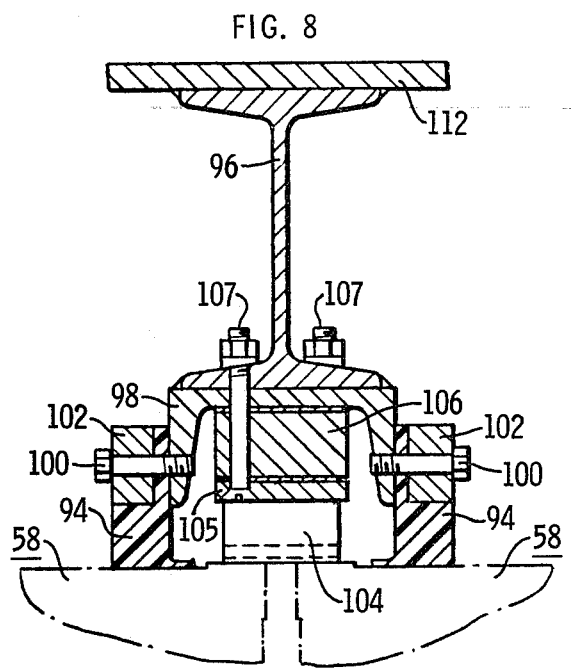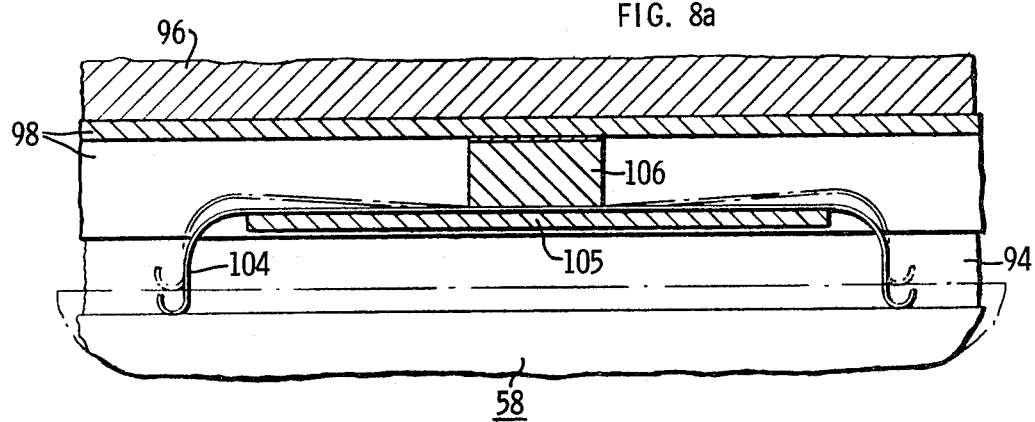

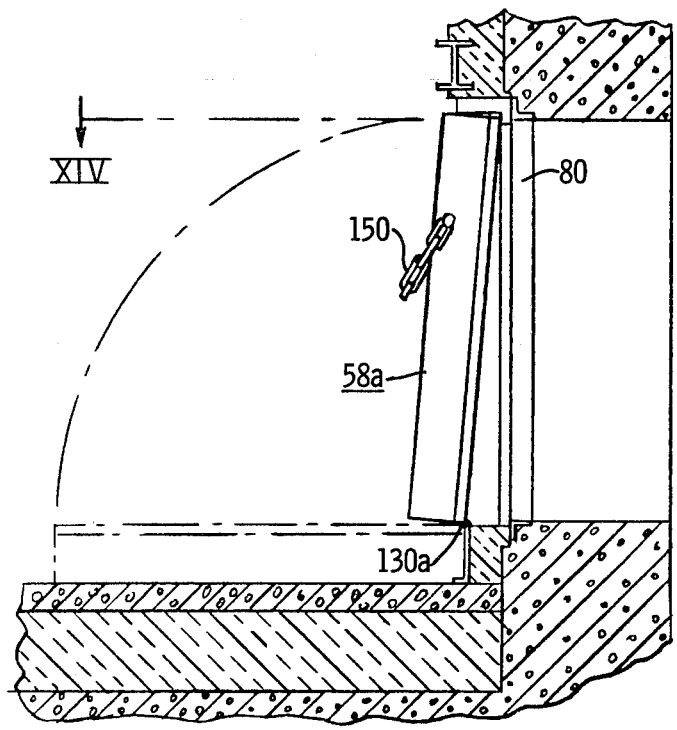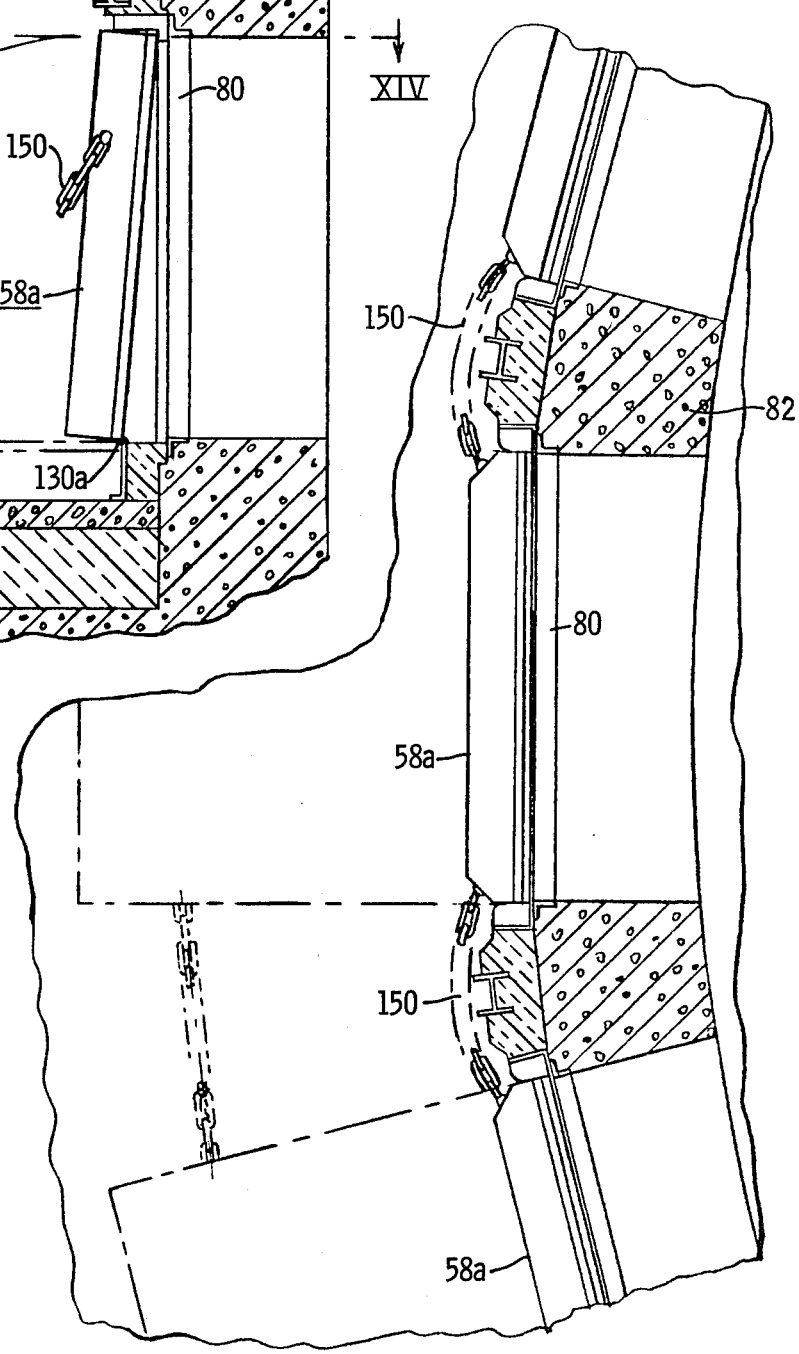

NUCLEAR REACTOR CONDENSER DOOR ARRANGEMENT

This application is a continuation of application Ser. No. 230,641 filed Mar. 1, 1972 (now abandoned) which is a continuation of application Ser. No. 837,443 filed June 30, 1969, now abandoned.

BACKGROUND OF THE INVENTION

This invention relates, generally, to nuclear reactor power systems and, more particularly, to a door arrangement for a condenser compartment of a reactor containment system of a condenser type, such as described in U.S. Pat. No. 3,423,286, issued Jan. 21, 1969 to S. J. Weems, J. A. Hinds and I. H. Mandil, and assigned to the Westinghouse Electric Corporation.

Basically, the reactor containment system of the condenser type involves the rapid absorption of the energy released from a reactor coolant system in the improbable event of a loss-of-coolant accident. The energy is absorbed by condensing the steam in a low temperature heat sink consisting of a suitable quantity of a fusible material in a solid state, such as ice, stored in a completely enclosed generally annular refrigerated compartment located radially between an inner wall which defines a reactor compartment and the outer wall of the containment, and in elevation, generally above an operating deck which divides the reactor compartment into a lower compartment and an upper compartment.

In the event of a loss-of-coolant accident, door panels located at the bottom of the condenser compartment would open almost immediately due to the pressure rise in the lower compartment caused by the release of reactor coolant. This would allow the steam to flow from the lower compartment into the ice condenser. In turn, door panels at the top of the ice condenser would open and allow some of the air which was initially in the lower compartment and the ice condenser compartment to flow into the upper compartment. The ice condenser would quickly begin to condense the steam, thus limiting the peak pressure in the containment.

Since the ice condenser inlet doors are located all around the lower compartment and the different reactor coolant loops are located in certain regions of the lower compartment, the flow of steam from a pipe break would not be evenly distributed to all sections of the ice condenser unless means were provided to prevent such maldistribution.

Accordingly, an object of this invention is to provide a door arrangement for the condenser compartment of a nuclear reactor containment that will properly distribute the energy released from a loss-of-coolant accident to all sections of the condenser.

Other objects of the invention will be explained fully hereinafter or will be apparent to those skilled in the art.

SUMMARY OF THE INVENTION

In accordance with one embodiment of the invention, the bottom doors and door ports of the generally annular condenser compartment of a reactor containment are so constructed that steam flow maldistribution is limited by one of two different mechanisms depending on the size of pipe break. Flow maldistribution is limited for accidents involving large pipe break sizes, which cause the doors to be blown fully open, by flow resistance due to door port flow areas of different sizes in different sections of the condenser. The inlet doors are normally held closed by springs. For small pipe breaks, the inlet doors are only partly opened and maldistribution is limited by characteristics of the springs which determine the degree of door opening.

BRIEF DESCRIPTION OF THE DRAWINGS

For a better understanding of the nature and objects of the invention, reference may be had to the following detailed description, taken in conjunction with the accompanying drawings, in which:

FIG. 5 is a view, in elevation, of one pair of inlet doors for the condenser compartment;

FIG. 6 is a view, in horizontal section, taken along the line VI—VI in FIG. 5;

FIG. 7 is a view, in vertical section, taken along the line VII—VII in FIG. 6;

FIGS. 8 and 8a are enlarged detail views of a portion of the structure shown in FIG. 6;

FIG. 13 is a detail view of an alternate door arrangement in which the doors are hinged horizontally at the bottom; and FIG. 14 is a view taken along the line XIV—XIV in FIG. 13.

DESCRIPTION OF PREFERRED EMBODIMENTS

Figure 1:
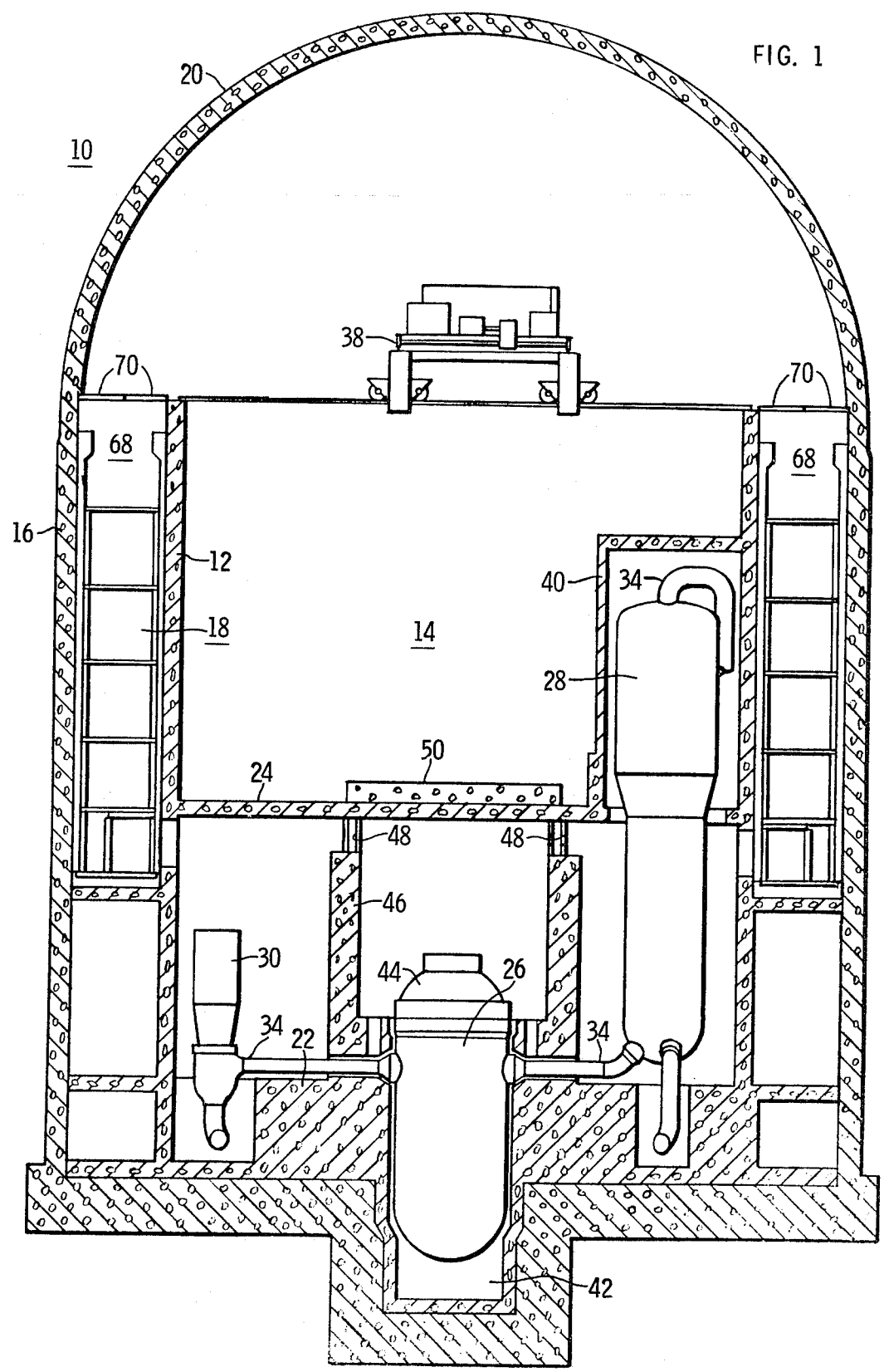
FIG. 1 is a vertical sectional view of a nuclear reactor containment having a condenser door arrangement embodying principal features of the invention.

Referring to the drawings, particularly to FIG. 1, a reactor containment structure 10 shown therein comprises an inner vertical generally cylindrical wall 12 defining a reactor compartment 14, an outer vertical generally cylindrical wall 16 spaced from the inner wall 12 to define a generally annular condenser compartment 18 between the walls 12 and 16, a generally hemispherical head 20 supported by the outer wall 16, and a horizontal floor 22. The containment structure is preferably formed from concrete.

As shown, the reactor compartment 14 is divided into upper and lower portions separated by an operating deck 24. The lower compartment completely encloses the fluid handling apparatus, i.e., reactor coolant system equipment, including a reactor vessel 26, steam generators 28, reactor coolant pumps 30, a pressurizer 32 shown in FIG. 2, and connecting piping 34. The upper compartment or portion contains a refueling canal 36 shown in FIG. 2, a crane 38 which is supported by the inner or crane wall 12, and additional refueling equipment (not shown). The steam generators 28 and the pressurizer 32 are enclosed by an extension 40 of the operating deck 24. The reactor vessel 26 is disposed in a well or sump 42 in the floor 22. The reactor vessel head 44 is enclosed by a primary shield 46 which is vented at 48. The vessel head enclosure is enclosed at the top by a removable concrete slab 50 which functions as a missile shield. The operation of the reactor power equipment is well known in the art and will not be described in this application.

Figure 2:
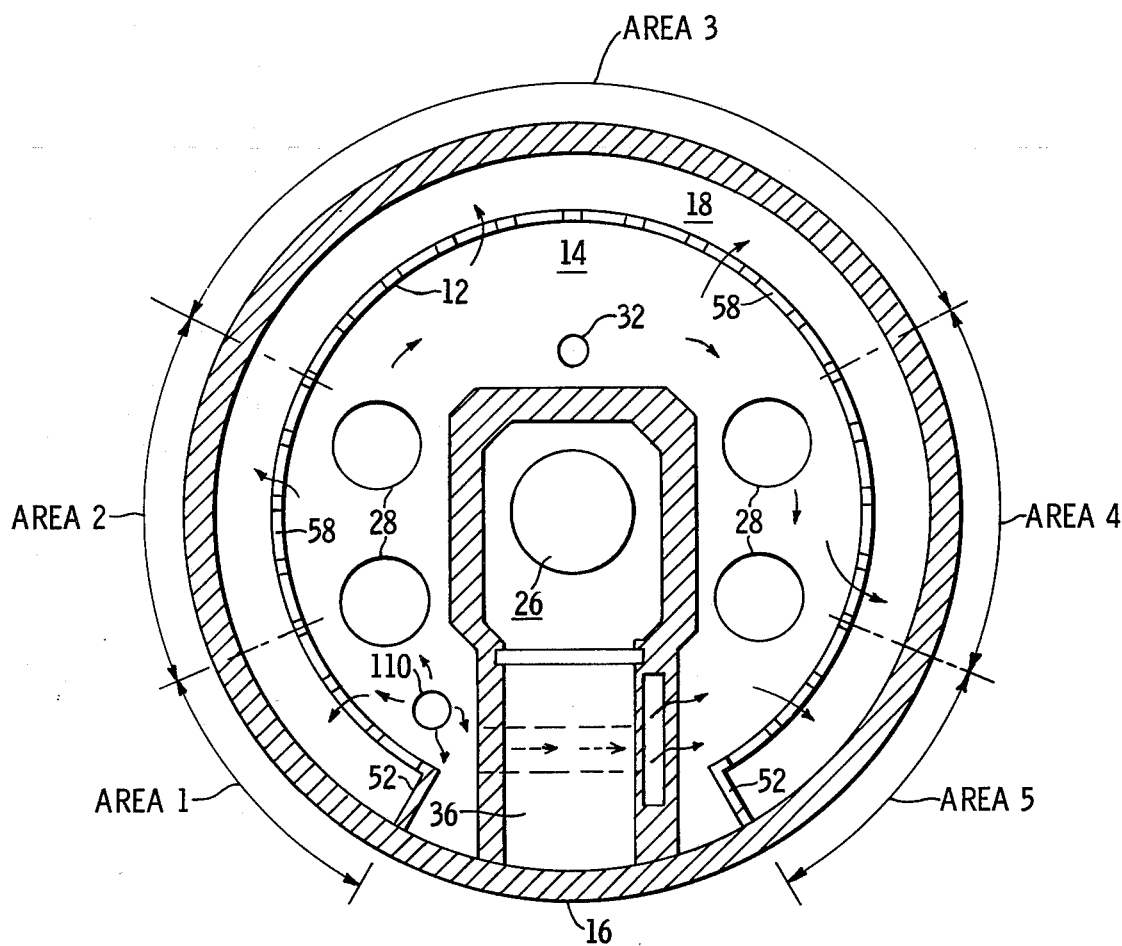
FIG. 2 is a view, partly in plan and partly in horizontal section, showing the general location of pressurized fluid-handling apparatus and inlet doors for the condenser compartment of the containment.

As shown more clearly in FIG. 2, the condenser compartment 18 is in the form of a completely enclosed, generally annular compartment which is located radially between the inner wall 12 and the outer wall 16, and in elevation, is generally above the operating deck 24. The condenser compartment 18 does not extend entirely around the containment structure, but does extend through an arc of approximately 300° as shown in FIG. 2. Thus, the condenser compartment substantially encircles the reactor compartment 14. The ends of the condenser compartment are enclosed by vertical end walls 52. As shown more clearly in FIG. 4, the top of the condenser compartment 18 is enclosed by horizontally hinged doors 54, and the bottom of the compartment is enclosed by an insulated floor 56. Vertically hinged inlet doors 58 are disposed in door ports 60 located in the inner wall 12 below the operating deck 24 and communicating between the reactor compartment 14 and the condenser compartment 18.

Figure 4:
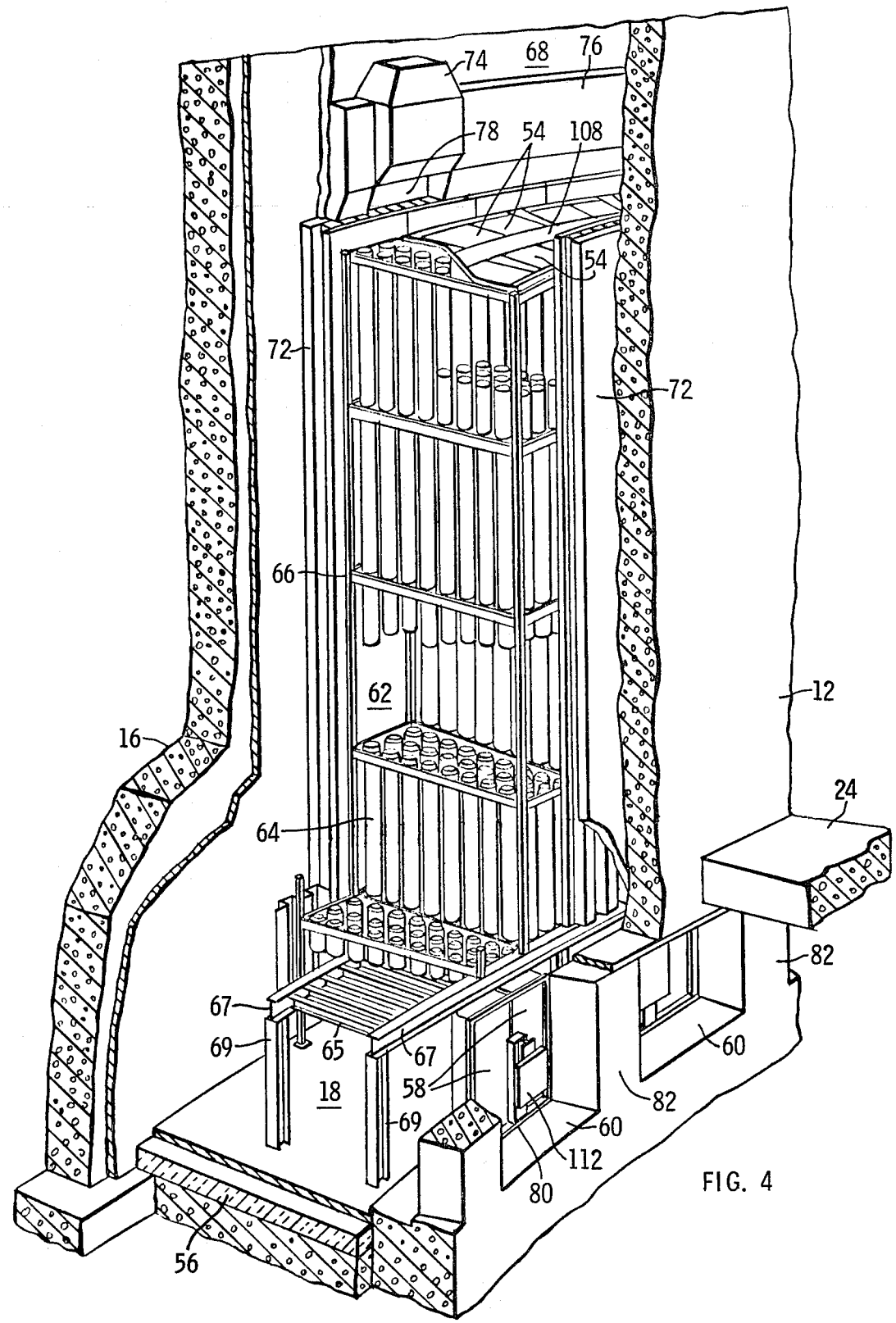
FIG. 4 is an isometric view of part of the condenser structure, portions being broken away for clearness.

The condenser compartment 18 contains a quantity of fusible material 62, such as ice, in a solid state. The material 62 has the property of melting at a temperature lower than the condensation temperature of the condensable portions of the reactor coolant fluid which may escape from the reactor coolant system. The fusible material 62 is supported in the condenser compartment 18 in the manner fully described in a U.S. Pat. No. 3,726,759 issued to W. G. Taft, R. Schift and A. J. Iredale and assigned to the Westinghouse Electric Corporation. Briefly, the material is contained in cylindrical porous containers 64 which are retained in horizontally spaced relation by means of vertically spaced frames 66 as shown in FIG. 4. Approximately ⅔ of the containers 64 rest on radial beams 65 supported above the floor 56 by circumferential beams 67 and vertical columns 69 to provide space for the doors 58 to open. The remaining containers rest directly on the floor 56.

As described in the Weems et al U.S. Pat. No. 3,432,286, in the event of a loss-of-coolant accident, the inlet doors 58 would open almost immediately due to the pressure rise in the lower compartment caused by the release of reactor coolant. This would allow the steam to flow from the lower compartment into the ice condenser. In turn, the door panels 54 at the top of the ice condenser would open and allow some of the air which was initially in the lower compartment and in the ice condenser compartment to flow into a plenum chamber 68 and thence into the upper reactor compartment through doors 70 located at the top of the plenum 68, as shown in FIG. 1. The ice condenser would very quickly begin to condense the steam, thereby limiting the peak pressure in the containment structure 10.

As explained in U.S. Pat. No. 3,844,855 issued to S. J. Weems, H. W. McCurdy and J. W. Johnson and assigned to the Westinghouse Electric Corporation, the storage of a large quantity of a low temperature fusible solid, such as ice, for long periods of time cannot be economically accomplished by conventional refrigeration and insulation systems. Prior systems give rise to unacceptable temperature gradients and convection of the atmosphere in which the solid is stored. Such temperature gradients and convection currents cause mass transfer of the solid by sublimation and frosting.

Established conventional methods of thermally insulating and cooling a cold storage compartment incorporate essentially separate insulation and cooling systems. The outermost boundaries of the compartment are lined with suitable low conductivity material and cooling is provided by a refrigerant circulating in pipes within the compartment or by circulating the compartment air over refrigerated coils. Such systems cause mass transfer of the solid material by sublimation and frosting since the refrigerated air is in direct contact with the solid material.

As described in the aforesaid copending application, in order to minimize mass transfer of the solid material, such as ice, due to sublimation and frosting, air or other suitable fluid is circulated in a circuit which is closed and effectively sealed relative to the compartment to be cooled. The air, or other fluid, is cooled by passing over coils (not shown) located in the plenum 68 and forming part of a conventional refrigeration system.

As shown more clearly in FIG. 4, all of the vertical walls of the condenser compartment 18 are lined with vertically extending insulated duct panels 72. Each panel 72 is a prefabricated integral air duct unit divided into downflow and upflow channels with a cross flow header at the bottom. Air is drawn from the plenum 68 through the refrigerator coils by fan units 74 and forced into the downflow channels through manifolds 76 which extend around the upper ends of the panels 72. The air flows down through the downflow channels of each panel and returns through adjacent upflow channels of the panel. The returning air exhausts directly into the plenum 68 through exhaust openings 78.

In this manner the heat gain from the walls is absorbed directly by the refrigerated cooling air and none of the heat is required to flow through the ice containing portion of the condenser compartment. Sublimation of ice is thus minimized by minimizing heat flow through the ice containing portion of the condenser compartment because no sublimation can occur without heat flow. Furthermore, since the refrigerated cooling air is not in direct contact with the ice, it does not absorb moisture from the ice, thereby reducing loss of ice by frosting of the refrigerated cooling coils.

As shown more clearly in FIGS. 5, 6 and 7, the inlet doors 58 at the bottom of the ice condenser 18 are thermally insulated panels mounted as vertically hinged pairs on an angle section frame 80 between concrete pillars 82 which support the crane wall 12 as shown in FIG. 4. As shown in FIGS. 5 and 6, each door panel comprises a foam plastic core 84, such as PVC (polyvinylchloride) with a bonded facing 86, which may be either sheet metal or plastic, and a relatively thick layer 88 of soft low density insulation, such as Fiberglas, retained by the facing 86.

The doors are provided with spring arrangements 90, different types of which are described hereinafter, which produce a small force to resist door opening. The magnitude of the force produced by the springs when the doors are fully open is equivalent to a differential pressure of approximately one pound per square foot. The doors are normally held shut against a lip seal 92, mounted on the frame 80, by the static differential pressure due to the high density cold air in the ice condenser compartment compared with the warm air in the reactor compartment.

In the fully closed position, the doors are required to compress a light spring arrangement, hereinafter described as the booster spring. This obviates the condition where with a number of doors in parallel between the compartments which are caused to open by a rising differential pressure across them, one door with the least resistance to opening will open first. When one door opens, flow is immediately initiated between the compartments, and the differential pressure across the remaining doors is that due to flow through the open door. This condition applies to the opening of the second door, and so on for all of the doors.

Under the foregoing circumstances, it is possible to have a flow of steam due to a small leak from the reactor coolant system such that all the doors will not open and which would produce a maldistribution of energy into the condenser. For small breaks this is not significant for short periods of time, but the continuation of this condition would melt out local areas of fusible material from the ice bed, allowing increased bypass of steam into the upper compartment and giving rise to higher final peak pressure in the containment resulting from blowdown.

In the fully closed position, the booster spring assembly is compressed approximately ¼ inch. Under normal operating conditions, the cold head in the ice condenser is sufficient to maintain the door closed against the spring. Furthermore, the spring rate is such that, should the door open under normal operating conditions, the main proportioning spring assembly will return the door to the point where it begins to compress the booster spring assembly and thereafter the cold head forcing a flow of air from the ice condenser into the lower compartment of the containment develops sufficient differential pressure across the door to compress the booster spring approximately ¼ inch allowing the doors to close fully.

The opening mode is such that, on an increase in pressure in the lower compartment, the first door will open when the pressure in the lower compartment and the force of the booster spring combined overcome the cold head in the ice condenser. Thus, when the door opens, the cold head in the ice condenser relieves into the lower compartment, reducing the pressure holding the remaining doors closed.

Before there can develop a positive differential pressure from the lower compartment to the ice condenser, and, therefore, before the flow can be induced into the bed, the pressure across all the doors will have balanced and the booster springs will have opened all the doors by ¼ inch. Thereafter, the main proportioning spring assemblies are able to maintain the required distribution of steam into the ice bed for small break sizes.

As shown more clearly in FIG. 8, the two doors 58 of each pair close against seals 94 supported by a vertical I-beam 96 mounted in the frame 80. The seals 94 are attached to a channel member 98 by bolts 100 which extend through metal members 102 bonded to the resilient seals 94. The channel member 98 is secured to the I-beam 96, as by welding. As also shown in FIG. 8, the doors 58 close against a compression spring 104 which may be of a leaf type and is the booster spring previously discussed. The spring 104 is mounted between a bar 105 and a block 106 secured in the channel member 98 by means of bolts 107. With zero differential pressure across the doors, the doors are slightly opened by the compression springs 104. Thus, all doors will open at any differential pressure which will cause steam to flow into the ice condenser and, within the limits of spring tolerances, the doors will all open equal amounts.

The doors 70 enclosing the top of the condenser compartment 18 and forming the roof of the upper plenum 68 are similar to, but lighter than the lower doors 58. These top doors 70 are supported by a bridge crane support structure (not shown). The crane support structure comprises radial I-beams spanning the ice condenser annulus at the top of the crane wall 12.

The doors 54 enclosing the ice compartment and forming the floor of the plenum 68 are similar to the doors described above. These doors 54 are supported by the upper ice basket positioning frame 66. A walkway 108 is provided between the two rows of doors 54. The upper door panels are hinged horizontally and are normally closed. Upon an increase in pressure in the ice condenser compartment, these doors will open as required allowing air to flow into the upper reactor compartment.

In order to properly distribute the energy released from a loss-of-coolant accident to all sections of the condenser compartment, the ice condenser bottom doors and their port flow areas are so constructed that flow maldistribution is limited by one of two different mechanisms depending on the size of pipe break. Flow maldistribution is limited for accidents involving large pipe break sizes, which cause the doors to be blown fully open, by flow resistance due to differences in port flow areas in accordance with their location relative to the fluid-handling apparatus in the reactor compartment. For small pipe breaks, the inlet doors are only partly opened and maldistribution is limited due to differences in spring constants of the spring arrangements provided for the doors.

Since the ice condenser inlet doors 58 are located all around the lower compartment and the different reactor coolant loops are located in certain regions of the lower compartment, the flow of steam from a pipe break would not be evenly distributed to the different sections of the ice condenser unless special means were provided to prevent such maldistribution. As shown in FIG. 2, the ice condenser compartment 18 may be divided into five areas with respect to the location of the fluid-handling apparatus in the reactor compartment 14. For a break at one end of the lower compartment as indicated at 110, the steam would tend to flow preferentially to nearby sections of the ice condenser. However, the steam flow into any section of the ice condenser is limited by the constructed flow resistance of the ice condenser inlet doors and the flow areas of the ports containing the doors. The resistances of the doors and the port flow areas are large relative to the resistance to flow around the reactor coolant system compartment, thereby tending to provide uniform flow to all sections of the ice condenser as shown by the arrows in FIG. 2.

To provide a more uniform distribution of steam than would be possible with uniform orificing, fixed preferential orificing of the inlet doors and door ports can be provided. This can be done by making the doors 58 and their ports 60 of one size in areas 1 and 5, of a larger size in areas 2 and 4, and of a still larger size in area 3. Thus, the flow resistance is determined by the port flow areas since the flow resistance is inversely proportional to the port flow area squared.

Figure 3:
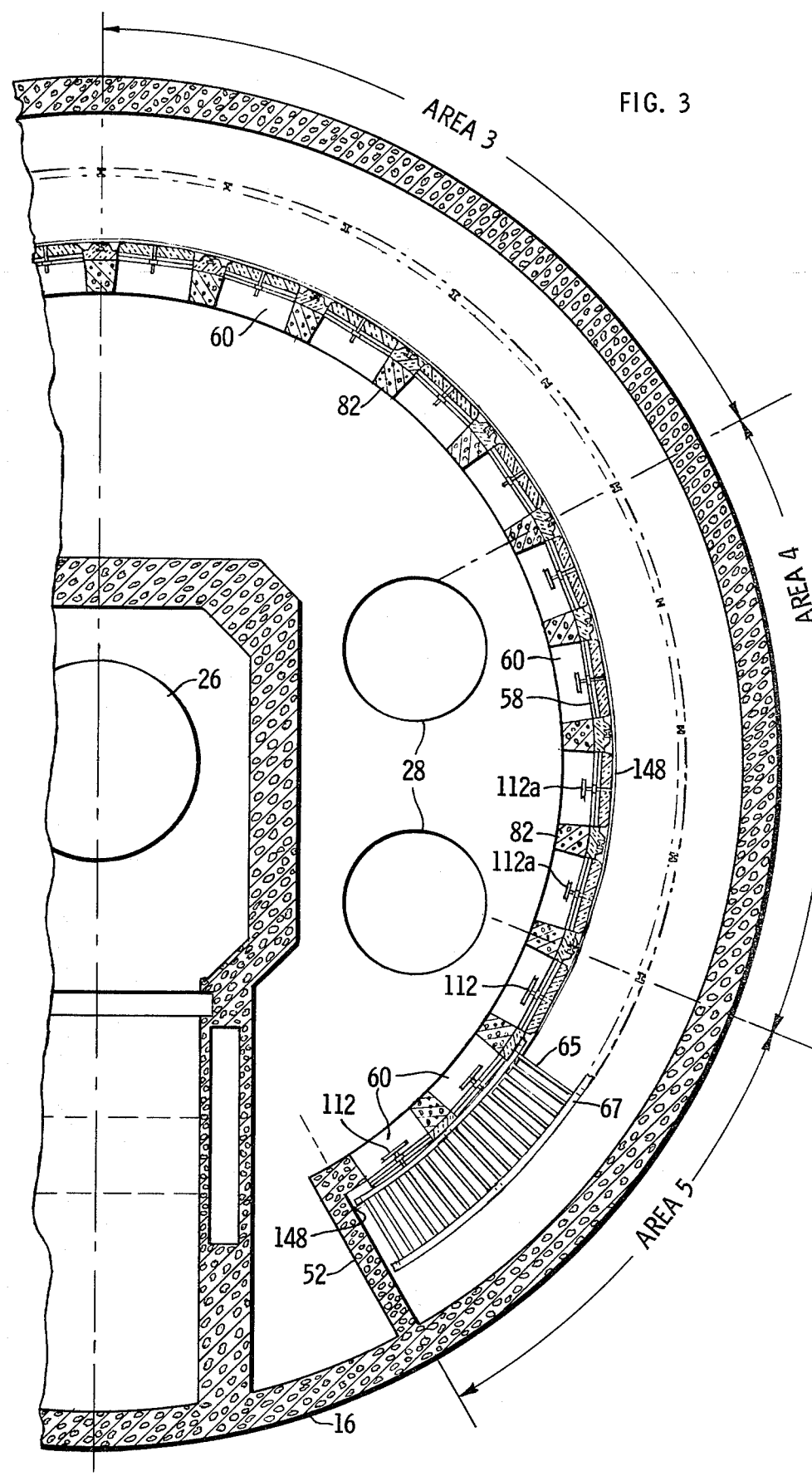
FIG. 3 is an enlarged view of one half of the structure shown in FIG. 2.

However, for manufacturing reasons it is desirable to make all doors and their port openings of the same size. When this is done, the net port flow area in any port opening can be determined by providing baffles 112 of one size for the ports 60 in areas 5 and 1 as shown in FIG. 3. Likewise, baffles 112a of a smaller size are provided for the port opening in areas 4 and 2. No baffles are provided for the port openings in area 3. As shown more clearly in FIG. 8, the baffles 112 may be secured to the I-beams 96 in a suitable manner, as by welding. In this manner the port flow areas of the port openings are determined in accordance with the location of the openings relative to the fluid-handling apparatus therefore, those ports having a large flow area or least resistance to flow, are located at the greatest distance from the fluid handling apparatus while those ports having small flow areas are located closer to the fluid handling apparatus.

Thus, the end sections 1 and 5 of the ice condenser are provided with smaller than average door port flow areas, and the center section 3 is provided with a larger than average door port flow area. Such fixed preferential orificing is utilized to provide a more uniform distribution of energy into the ice condenser than would otherwise be the case with uniform orificing. The preferential orificing required for substantially uniform energy distribution around the condenser can be calculated mathematically based on straightforward thermodynamic principles.

Figure 10:
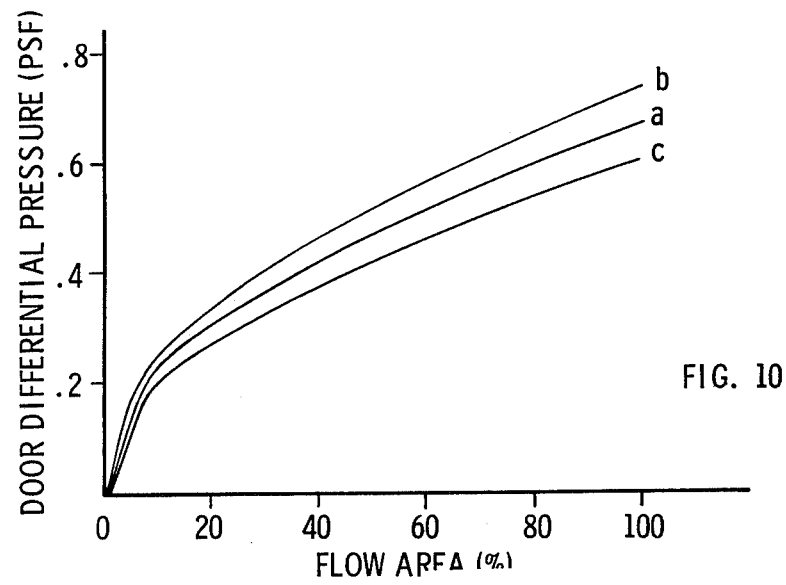
FIG. 10 is a graphical view showing door opening characteristics as a function of door differential pressure for springs of the type shown in FIG. 9 having different spring constants.

As explained hereinbefore, maldistribution for accidents involving small pipe breaks is limited by the spring tolerances of spring arrangements 90 provided for each door. FIG. 10 shows door opening characteristics as a function of door differential pressure based on different spring constants. Thus, curve "a" shows the opening characteristics for doors having an assumed spring constant of one value, curve "b" shows the characteristics for a spring constant of a higher value and curve "c" shows the characteristics for a spring constant of a lower value.

The ratio of maximum steam flow which can enter the weakest sprung door as compared to the average steam flow going through the other doors of the ice condenser is such that a peak value of maximum to average flow into the different sections of the ice condenser is easily limited to a small value. Further, such maldistribution can be reduced additionally by preferential location of weaker and stronger springs in much the same manner as the door ports may be preferentially orificed for large pipe breaks. Thus, for the case of small pipe breaks wherein the bottom doors of the ice condenser are partly open, these doors limit the ratio of maximum to average flow of steam into any section of the ice condenser to a reasonably low value. As previously explained, the ratio of maximum to average flow of steam into the ice condenser for pipe break sizes large enough to fully open the doors is limited by the door port flow areas. This ratio is also kept to a reasonably low value.

Figure 9:
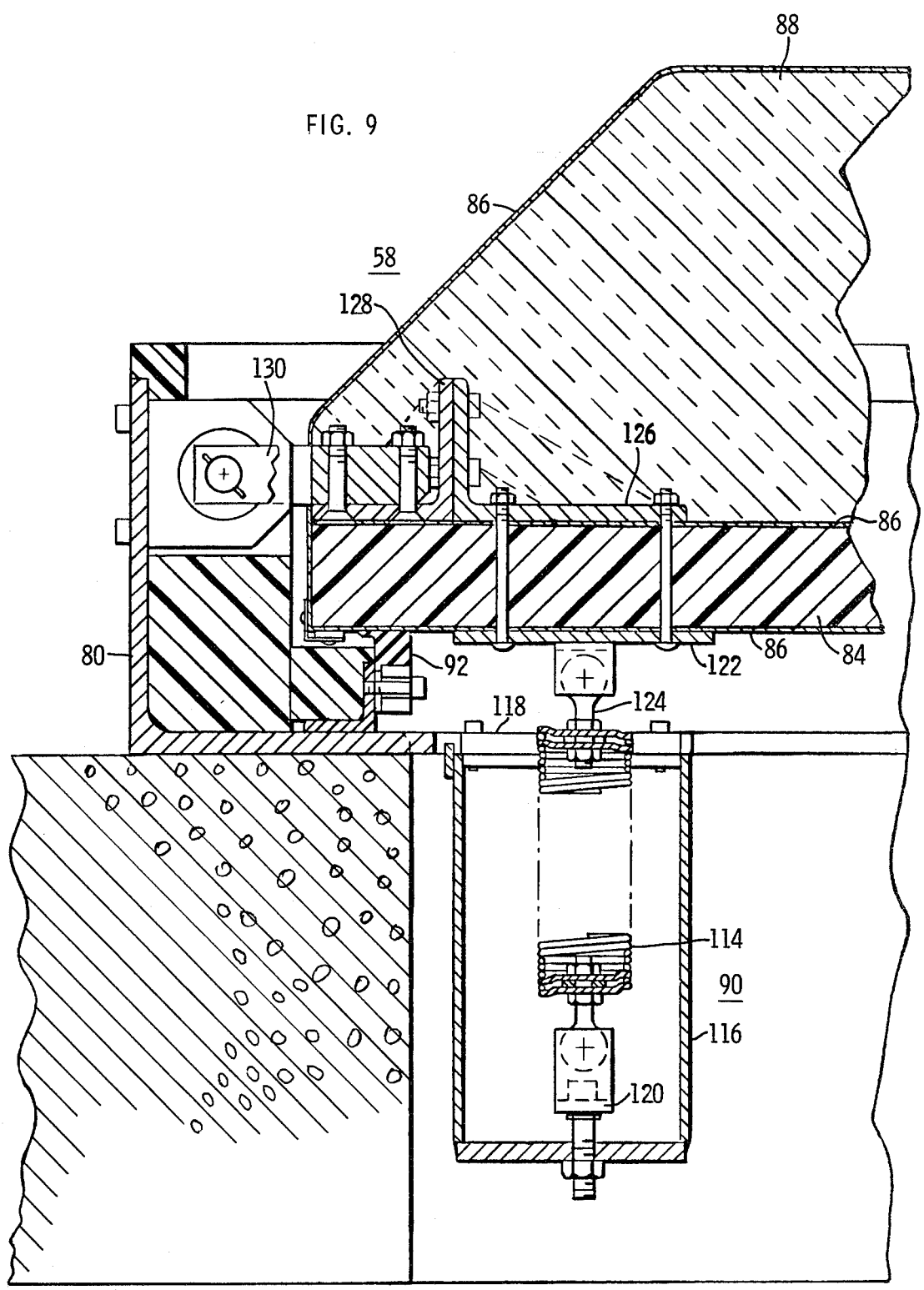
FIG. 9 is an enlarged detail view of a hinge support and a closing spring for one of the doors shown in FIG. 5.

One spring arrangement 90 suitable for use with the doors 58 is shown in FIG. 9. A tension spring 114 is mounted in a housing 116 attached to an extension 118 on the door frame 80. One end of the spring 114 is adjustably attached to the housing 116 by means of a self-aligning connecting member 120. The other end of the spring 114 is attached to a plate 122 by means of a self-aligning connecting member 124. The plate 122 is bolted to an angle member 126, which, in turn, is bolted to an angle member 128 bolted to a door hinge 130. The tension of the spring 114 may be adjusted by means of the member 120.

Figure 11:
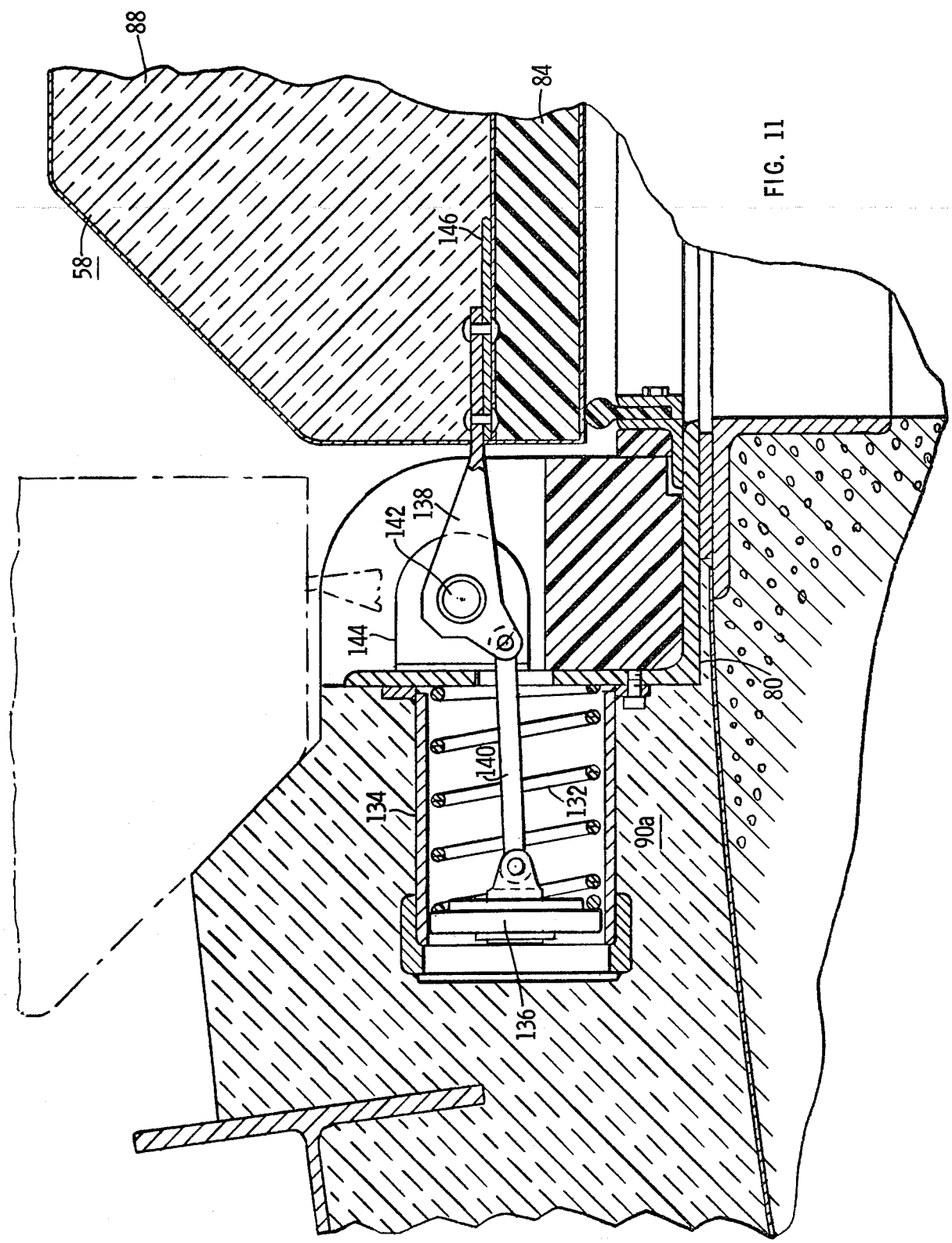
FIG. 11 is a view, similar to FIG. 9, of a modified door closing spring arrangement.

Another spring arrangement 90a suitable for biasing the door 58 toward the closed position is shown in FIG. 11. A compression spring 132 is mounted in a housing 134 attached to the door frame 80. The spring 132 actuates a spring seat 136 which is attached to a pivoted crank arm 138 by means of a link 140. The arm 138 pivots on a pin 142 supported by a bracket 144 attached to the door frame 80. The arm 138 is attached to a plate 146 which, in turn, is attached to the core 84 of the door 58. As previously stated, the spring 132 biases the door 58 toward its closed position.

Figure 12:
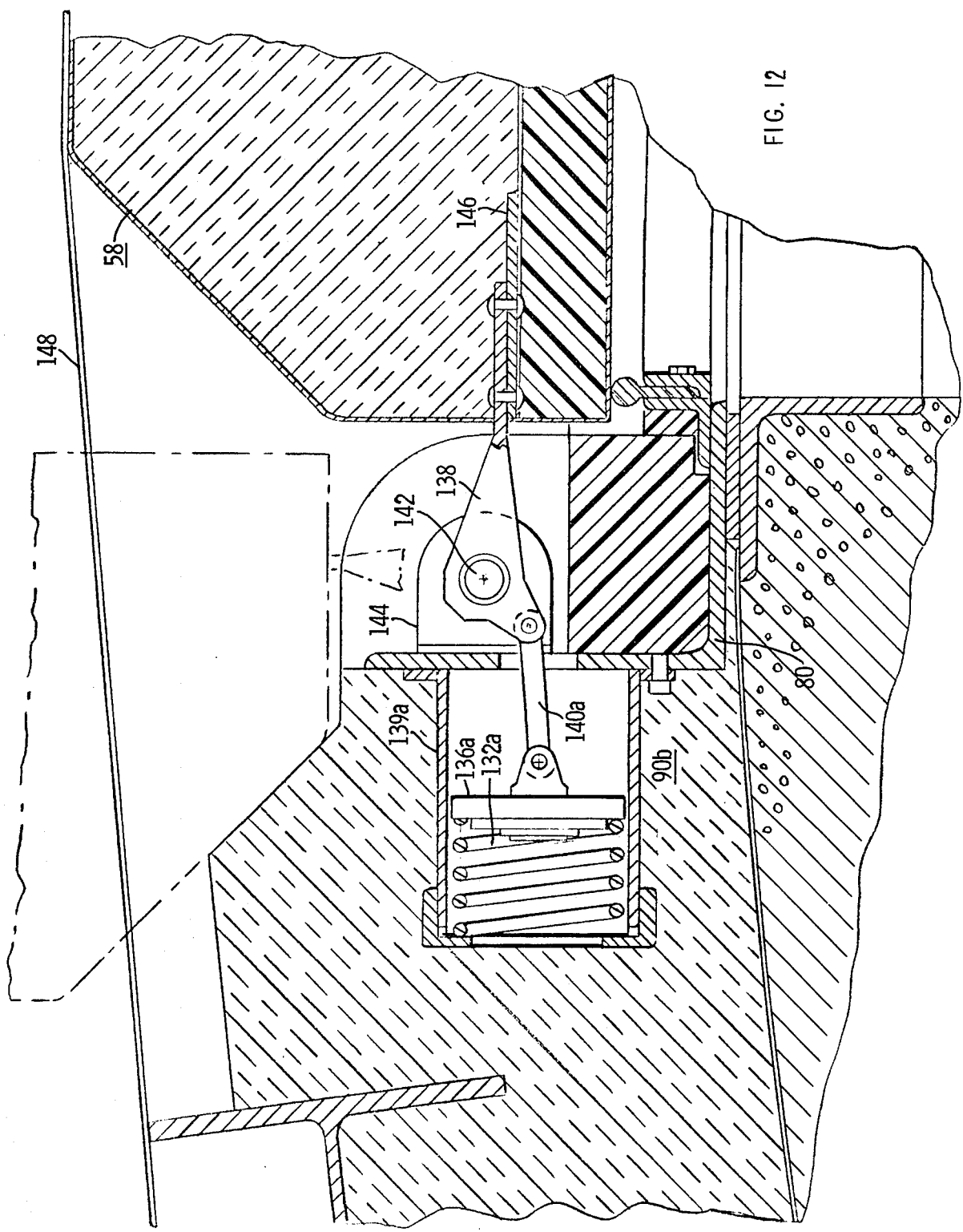
FIG. 12 is another view, similar to FIG. 9, of a modified spring arrangement in which the doors are biased open by springs.

Another spring arrangement 90b is shown in FIG. 12. This arrangement can be used to limit maldistribution for small pipe breaks by causing all lower doors 58 to open fully if any one door 58 is opened. With this arrangement the doors 58 are biased toward the open position by spring members. All of the doors are held closed during normal operation by a single wire rope 148 which overcomes the individual door spring forces. As shown in FIG. 3, the wire rope 148 may be attached to the end walls 52 of the condenser compartment. The wire rope 148 is set to break and release the doors at the desired door pressure loading or for any case whereby any individual door opens.

As shown in FIG. 12 a compression spring 132a is mounted in a housing 134a attached to the door frame 80. The spring 132a actuates a spring seat 136a connected to the crank arm 138 by a link 140a. The spring 132a is so disposed between the seat 136a and the housing 134a that the spring biases the door 58 toward the open position.

An over-center gravity-opened door arrangement is shown in FIGS. 13 and 14. In this arrangement each door 58a rotates about a horizontal, bottom-mounted hinge 130a and is normally inclined at a slight offset, about 10° from the vertical position. This 10° offset is provided to permit the door panels to open to allow temporary venting of air into the ice condensor if needed during normal operation and to assure that the panels will reshut after this type of venting. The doors are normally held closed by the static differential pressure of the cold high density air in the condenser compartment. As shown in FIGS. 13 and 14, the doors 58a are mechanically connected together by link chains 150. The chains 150 are so connected that opening of any one door causes all doors to open. Sufficient slack is provided in the chains to permit any one door to swing past its dead center position after which it will cause the adjacent doors to open. This action is continued to cause all the doors to open as a result of any one door being opened by differential pressure.

If desired, the hinge 130a for each door 58a may be so located that the door is in a vertical position when closed. As previously explained the doors are normally held closed by the differential air head due to the cold high density air in the condenser. If the steam pressure difference across the doors nullifies the cold air differential head, all doors will fully open due to gravity and admit steam flow to the condenser.

From the foregoing description it is apparent that the invention provides a relatively simple spring-biased door arrangement to reliably seal the ice condenser compartment for normal plant operation, thereby preventing excessive moisture and heat gain. All doors will open automatically as necessary during a loss-of-coolant accident. No active system is required to open the doors, since the natural forces resulting from the accident itself will force the doors open.

The inlet doors and door ports will properly distribute the energy to all sections of the ice condenser, thereby providing efficient operation of the condenser. In the event of large pipe break accidents, the inlet doors are fully opened. In the case of small pipe break accidents, the inlet doors are only partly opened.

The door ports are sized to provide the necessary resistance to steam flow into any section of the ice condenser to limit the maximum flow of steam and energy to an acceptably low value. Furthermore, the door port flow areas are nonuniformly sized to preferentially orifice the flow of steam into certain sections of the condenser so as to reduce maldistribution to a low value.

The doors evenly proportion the flow of steam into each section of the condenser for small pipe break accidents by providing suitable resistance to flow due to spring action which resists opening of any door. For small pipe breaks, the differential pressure which causes steam flow into the ice condenser is essentially the same value across each door, thereby causing each door to be open the same amount and steam to flow evenly into the condenser. However, if desired, different spring constants can be used to preferentially distribute steam flow into certain sections of the ice condenser.

The doors are normally held closed against relatively light compression springs by the static differential pressure due to the cold high density air in the condenser compartment. These springs function to open all doors a small amount in case of a loss of this differential pressure by the opening of any one door.

Since numerous changes may be made in the above-described construction and different embodiments of the invention may be made without departing from the spirit and scope thereof, it is intended that all subject matter contained in the foregoing description or shown in the accompanying drawings shall be interpreted as illustrative and not in a limiting sense.

We claim as our invention:

1. A pressure suppressing arrangement for pressurized fluid-handling apparatus including a nuclear reactor and associated coolant system from which a pressurized expansible fluid may escape comprising:

a reactor compartment housing said fluid-handling apparatus;

an annular condenser compartment substantially encircling the reactor compartment;

means for supporting a quantity of fusible material in a solid state in the condenser compartment, said material having the property of melting at a temperature lower than the condensation temperature of the condensable portions of said escaping expansible fluid;

a plurality of door ports in the condenser compartment wall which establish communication between the condenser compartment and the reactor compartment, said ports containing normally closed hinged doors openable in response to a differential pressure between said compartments;

said doors and ports being of a size to provide a resistance to flow of the escaping fluid from the reactor compartment into said condenser compartment, said resistance being of one value in that area closest to the fluid handling apparatus, and a lesser value in those areas farther away from said apparatus, so as to more uniformly distribute the energy in said fluid to all sections of the condenser compartment.

2. The combination defined in claim 1, wherein door ports located close to the fluid-handling apparatus have a smaller cross-sectional area than ports located at a greater distance from said apparatus.

3. The combination defined in claim 1, wherein said door ports are of the same size, and flow restricting means secured in selected ports for limiting flow from the reactor compartment through said selected ports into the condenser compartment.

4. The combination defined in claim 3, wherein the flow restricting means comprises baffles of different surface area in adjacent sections of selected door ports the size of said baffles decreasing in surface area from section to section as the sections increase in distance from said fluid handling apparatus.

* * * * *